US008327737B2

(12) United States Patent
Uimonen

(10) Patent No.: US 8,327,737 B2
(45) Date of Patent: Dec. 11, 2012

(54) ADJUSTABLE HANDLEBAR FOR A BICYCLE

(75) Inventor: Joakim Uimonen, Taipei County (TW)

(73) Assignee: Dahon and Hon Industrial Labs, Ltd., Sanchong (TW)

( * ) Notice: Subject to any disclaimer, the term of this patent is extended or adjusted under 35 U.S.C. 154(b) by 846 days.

(21) Appl. No.: 12/457,532

(22) Filed: Jun. 15, 2009

(65) Prior Publication Data
US 2010/0313702 A1 Dec. 16, 2010

(51) Int. Cl.
*B62K 21/16* (2006.01)
(52) U.S. Cl. ...................... 74/551.5; 74/551.3
(58) Field of Classification Search .................. 280/276, 280/278, 279, 47.371; 403/322.4, 323; 74/551.1–551.8; *B62K 21/16*
See application file for complete search history.

(56) References Cited

U.S. PATENT DOCUMENTS
6,467,372 B2 * 10/2002 Klieber .................. 74/551.1

FOREIGN PATENT DOCUMENTS
DE 20205492 U1 * 8/2002

* cited by examiner

*Primary Examiner* — James Pilkington
*Assistant Examiner* — Richard Urbanski
(74) *Attorney, Agent, or Firm* — Bacon & Thomas, PLLC

(57) ABSTRACT

A bicycle is disclosed. A direction control device thereof comprises a handlebar, a steering stem, two adjusting stems, and a quick switch device. The steering stem is connected to the main frame and comprises a longitudinal rod and a horizontal rod. Each adjusting stem comprises an adjusting main body, a first clamping portion, and a second clamping portion. Both ends of the horizontal rod are clamped by each first clamping portion; the handlebar is clamped by each second clamping portion. There are two clamping states of the first and second clamping portions: a fastening state and a non-fastening state. The quick switch device is coupled to each adjusting stem and controls the clamping state of each first clamping portion and each second clamping portion.

12 Claims, 7 Drawing Sheets

ADJUSTABLE HANDLEBAR FOR A BICYCLE

BACKGROUND OF THE INVENTION

1. Field of the Invention

The present invention relates to a bicycle with a height and angle adjustable handlebar.

2. Description of the Related Art

The height and angle of a handlebar of a common bicycle are fixed, that is, not adjustable. In order to improve the comfort of riding a bicycle or to accommodate different conditions for riding a bicycle (e.g. riding a bicycle in the open country or in the city, or high speed riding), a bicycle with a height and angle adjustable handlebar has been developed.

EP patent 0736447 discloses an adjustable coupling piece used for coupling a handlebar to a steering stem of a bicycle. It is characterized in that the adjustable coupling piece comprises a body and a clamping mechanism, wherein the body comprises coupling parts. The coupling parts are coupled to the handlebar. The relative position of the handlebar can be adjusted by adjusting the clamping mechanism. However, there is only one body of the adjustable coupling piece. When a user is riding a bicycle, usually the entire weight of the upper part of his or her body presses down on the handlebar. The body of the adjustable coupling piece bearing the weight for a long time may cause fatigue damage. Also, when a bicycle accessory needs to be mounted, it is not mounted to the middle portion of the handlebar. The bicycle, then, seems unsightly and unbalanced in appearance. Moreover, if the bicycle accessory is a headlight, the light cannot illuminate the area directly in front of the bicycle.

In addition, U.S. Pat. No. 6,584,872 discloses a handle mounting member of a bicycle. It is characterized in that the main body of the handle mounting member comprises a pair of leg sections (approximately U-shaped) that define a receiving space therebetween, which allows a display unit to be located within it. The main body is coupled to the handlebar and the height of the handlebar is capable of adjustment. However, the handlebar is made of two sections in order to cooperate with the main body. Also, when the height of the handlebar is being adjusted, the angle of the handlebar cannot be adjusted simultaneously due to structural limitations. The angle can be adjusted only by additionally loosening bolts. The relatively more complicated structure increases the cost, and the limitation of not having the capability to allow the user to simultaneously adjust the height and the angle of the handlebar is an inconvenience.

Therefore, it is desirable to provide a bicycle to mitigate and/or obviate the aforementioned problems.

SUMMARY OF THE INVENTION

An object of the present invention is to provide a bicycle with a handlebar whose height and angle can be adjusted simultaneously.

Another object of the present invention is to provide a bicycle with a receiving space formed in the middle portion of the handlebar, which allows a bicycle accessory to be located within it.

A further object of the present invention is to increase the connection strength and stability between a handlebar and a steering stem.

A still further object of the present invention is using only one quick switch device to control the clamping state of two adjusting stems simultaneously.

In order to achieve the abovementioned objectives, the bicycle of the present invention comprises a front wheel, a rear wheel, a pedal gear device, a direction control device, and a main frame, which connects the aforementioned components. The direction control device is used for controlling the direction of the front wheel.

It is characterized in that the direction control device thereof comprises a handlebar, a steering stem, two adjusting stems, and a quick switch device. The steering stem is connected to the main frame and comprises a longitudinal rod and a horizontal rod. Each adjusting stem comprises an adjusting main body, a first clamping portion, and a second clamping portion. The longitudinal rod is connected to the horizontal rod. The horizontal rod is substantially parallel to the handlebar. Each adjusting stem comprises an adjusting main body, a first clamping portion, and a second clamping portion, wherein the first clamping portion and second clamping portion are located at both ends of the adjusting main body. Both ends of the horizontal rod are clamped by each first clamping portion with two clamping states: a fastening state and a non-fastening state. The handlebar is clamped by each second clamping portion with two clamping states: a fastening state and a non-fastening state. The quick switch device is coupled to each adjusting stem and is used for controlling the clamping state of each first clamping portion and each second clamping portion.

In one embodiment of the present invention, the quick switch device controls the clamping state of each first clamping portion and each second clamping portion simultaneously. The quick switch device comprises two eccentric quick releases. Each controls the clamping state of each first clamping portion and each second clamping portion of each adjusting stem.

DETAILED DESCRIPTION OF THE PREFERRED EMBODIMENT

The advantages and innovative features of the invention will become more apparent from the following detailed description when taken in conjunction with the accompanying drawings.

Figure 1:
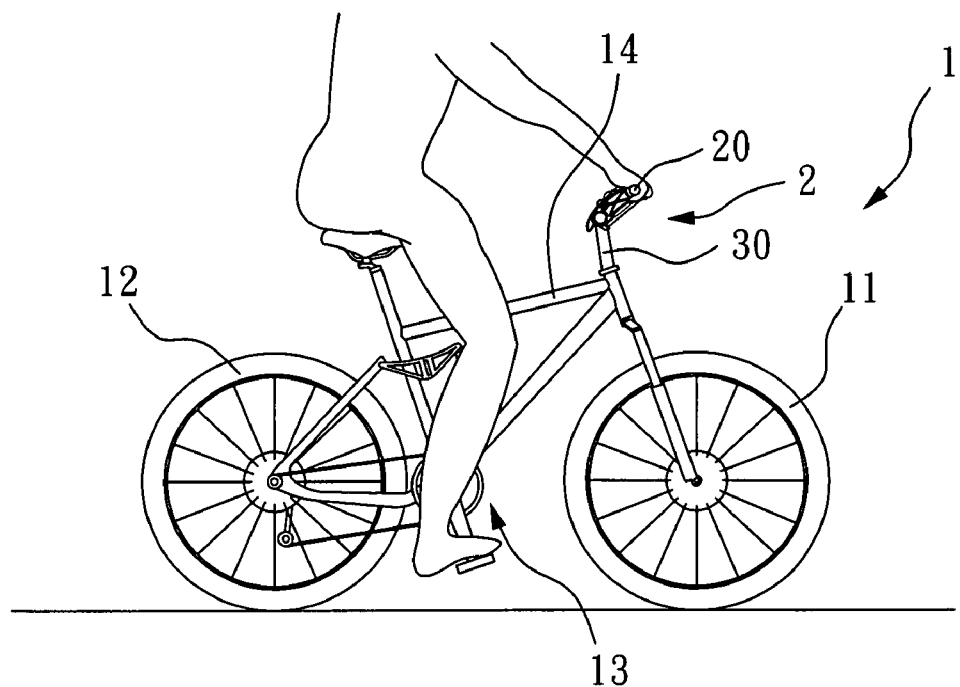
FIG. 1 is a schematic drawing of a bicycle of the present invention.
Figure 2:
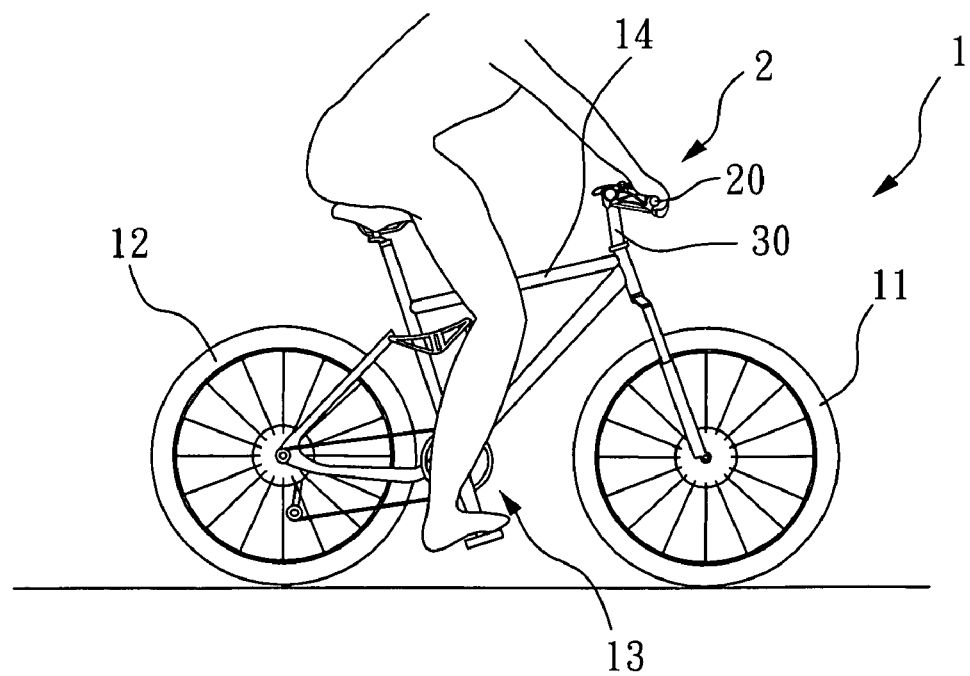
FIG. 2 is another schematic drawing of the bicycle of the present invention showing a handlebar in a position different from that in FIG. 1.

Please refer to FIG. 1 and FIG. 2 first. A bicycle 1 of the present invention comprises a front wheel 11, a rear wheel 12, a pedal gear device 13, a direction control device 2, and a main frame 14, which connects the aforementioned components. The direction control device 2 is used for controlling the direction of the front wheel 11. The key point of the present invention is that the position of a handle bar 20 of the direction control device 2 can be adjusted, as shown in FIG. 1 and FIG. 2. The direction control device 2 is illustrated in the following.

Please refer to FIGS. 1~4. The direction control device 2 mainly comprises the handlebar 20, a steering stem 30, two adjusting stems 40, and a quick switch device 50.

Figure 3:
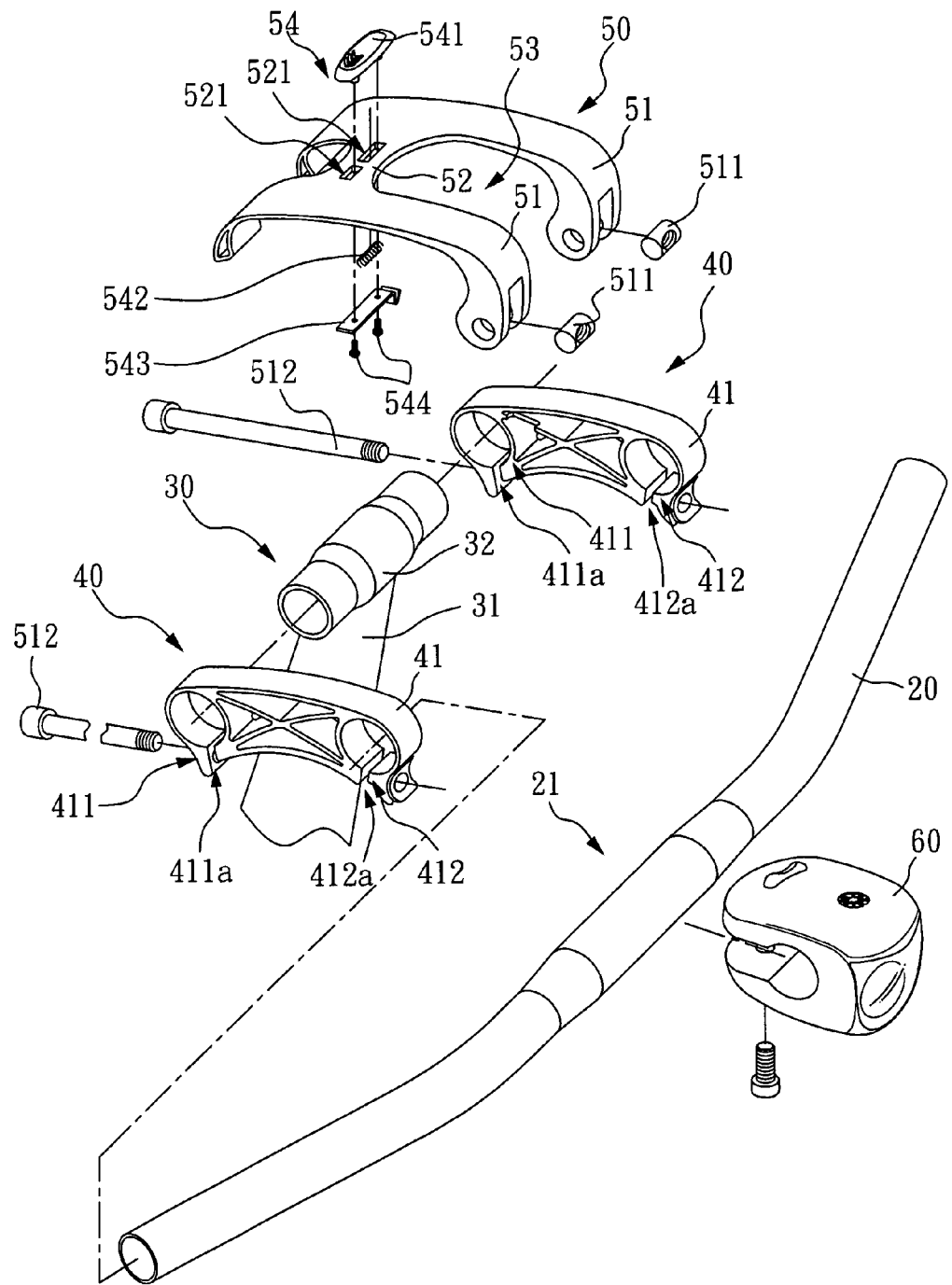
FIG. 3 is an exploded perspective view of a direction control device of the bicycle of the present invention.

The steering stem 30 is connected to the main frame 14 (please refer to FIG. 1). As shown in FIG. 3, the steering stem 30 comprises a longitudinal rod 31 and a horizontal rod 32. The longitudinal rod 31 is connected to the horizontal rod 32. The horizontal rod 32 is substantially parallel to the handlebar 20. In the embodiments of the present invention, the longitudinal rod 31 is substantially perpendicular to the horizontal rod 32. The longitudinal rod 31 is joined to the horizontal rod 32 by a suitable means, such as soldering.

To achieve greater strength and stability between a handlebar 20 and a steering stem 30, the attaching width 40d on the handlebar 20 between the two adjusting stems 40 is preferably more than 40 mm which is wider than existing designs (e.g. EP patent 0736447, a single adjusting stem attaching to the bar with a width of 25 mm at most). Please note that too narrow of a width 40d between the two adjusting stems 40 does not provide adequate strength and stability. Therefore, comparing to EP patent 0736447, the present invention does not simply add one more adjusting stem. EP patent 0736447 and other existing designs do not have such a wide width 40d. The major reason to apply two adjusting stems 40 in the present invention is to allow width 40d to be sufficiently wide. Each adjusting stem 40 comprises an adjusting main body 41, a first clamping portion 411, and a second clamping portion 412, wherein the first clamping portion 411 and second clamping portion 412 are located at both ends of the adjusting main body 41. Both ends of the horizontal rod 32 are clamped by each first clamping portion 411, and the handlebar 20 is clamped by each second clamping portion 412. In this embodiment, the clamping portions 411, 412 are matched to the shape of the horizontal rod 32 and the handlebar 20. The shape of the clamping portions 411, 412 is a circular hole, and each clamping portion 411, 412 comprises thin gaps 411a, 412a.

The quick switch device 50 is coupled to each adjusting stem 40 and used for controlling the clamping state of each first clamping portion 411 and each second clamping portion 412. In one embodiment of the present invention, the quick switch device 50 controls the clamping state of each first clamping portion 411 and each second clamping portion 412 simultaneously. This will be described in detail below.

The quick switch device 50 comprises two eccentric quick releases 51. Each eccentric quick release 51 comprises a pivot eccentric part 511 and a tensioning rod 512. Each pivot eccentric part 511 is located at each second clamping portion 412. Each tensioning rod 512 passes through each adjusting stem 40 and pivots the pivot eccentric part 511. Each eccentric quick release 51 controls the clamping state (two states: a fastening state and a non-fastening state) of each first clamping portion 411 and each second clamping portion 412 of each adjusting stem 40. Since the eccentric quick release 51 is a well-known design, there is no need for further description. In addition, using an eccentric quick release to control a clamp is very convenient, but eccentric quick release is not as secure as a bolt type system. Therefore, two eccentric quick releases 51 cooperating two adjusting stems 40 serve as a safer, stronger, more secure system.

Figure 6:
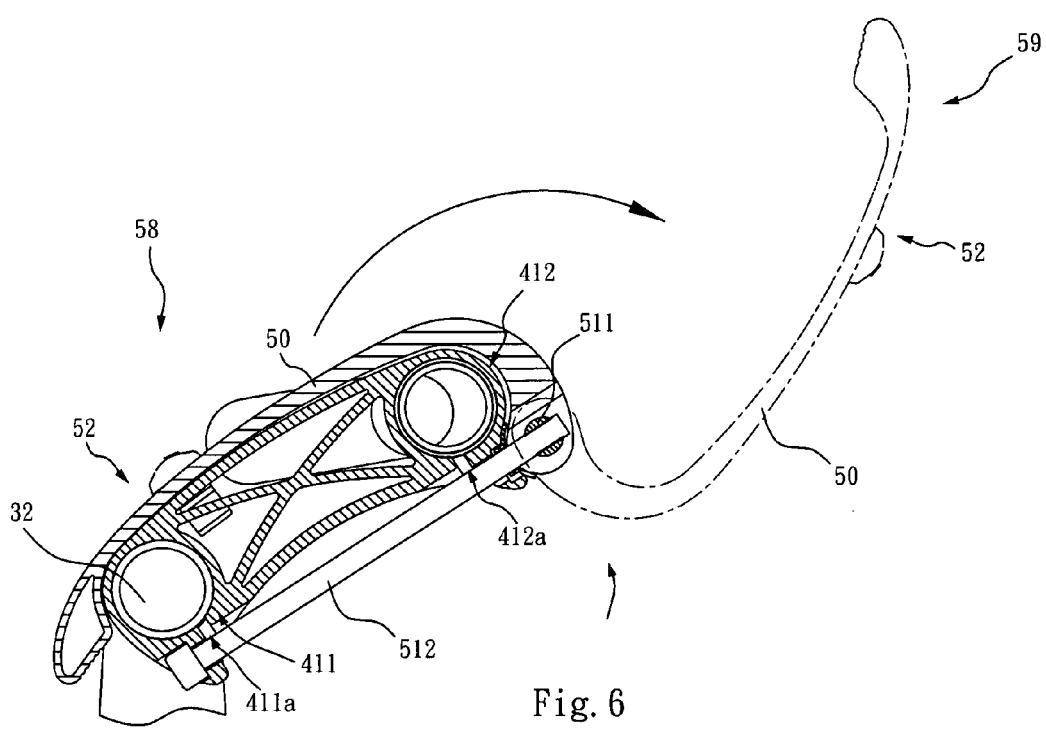
FIG. 6 is a schematic drawing of a quick switch device of the bicycle of the present invention, showing a switch from a fastening state to a non-fastening state.

One of the features of the present invention is that the quick switch device 50 further comprises a horizontal connecting component 52 for connecting the two eccentric quick releases 51 such that the two eccentric quick releases 51 can be operated simultaneously. When a user moves the horizontal connecting component 52 upward, away from the horizontal rod 32, the relative positions of each pivot eccentric part 511, each tensioning rod 512, and each adjusting stem 40 change. This changes the width of the thin gaps 411a, 412a so that the clamping state of each first clamping portion 411 and each second clamping portion 412 becomes the non-fastening state 59, as shown in FIG. 6. When the user moves the horizontal connecting component 52 back against the horizontal rod 32, the clamping state of each first clamping portion 411 and each second clamping portion 412 returns to the fastening state 58.

Figure 4:
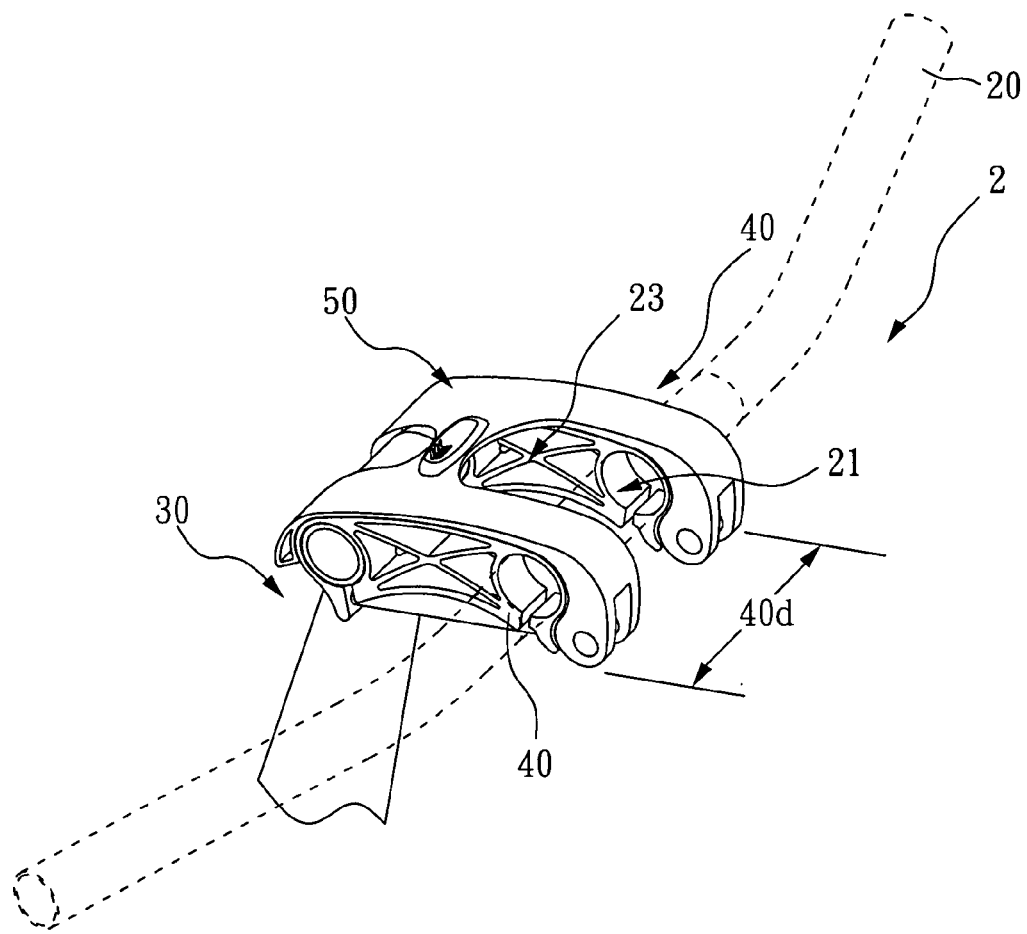
FIG. 4 is a perspective view of the direction control device of the bicycle of the present invention.
Figure 5:
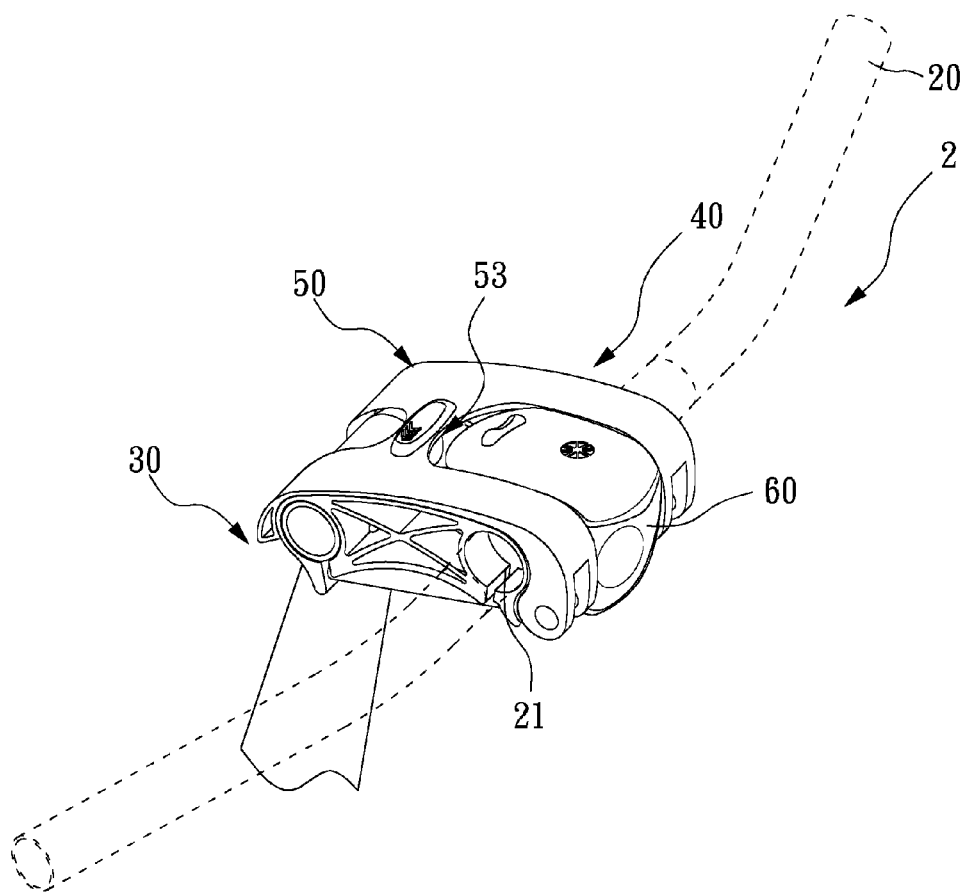
FIG. 5 is a perspective view of the direction control device of the bicycle of the present invention showing a bicycle accessory mounted to the handlebar.

Another feature of the present invention is that there is a free space 53 formed between the horizontal connecting component 52 and the two eccentric quick releases 51 such that a receiving space 21 is formed in the middle portion of the handlebar 20 (FIG. 3 and FIG. 4). Thus, a bicycle accessory 60 (a headlight in this embodiment) can be located in the receiving space 21. Because the receiving space 21 is part of the handlebar 20, the bicycle accessory 60 can be securely mounted to the handlebar 20 conveniently. Also, the receiving space 21 is in the middle portion of the handlebar 20, thereby allowing attachment of any bicycle accessory 60 which is suitable to be located in the middle portion of the handlebar 20. Some examples are a headlight, a mileage meter, a speedometer, a photographing apparatus, a GPS device, Cell phone, PDA (personal digital assistant), other kind personal computer or only the user interface of the computer. In addition, the design of the bicycle accessory 60 is preferred to have an appearance integrated with the quick switch device 50. As shown in FIG. 5, the free space 53 of the quick switch device 50 and the receiving space 21 of the handlebar 20 allow the bicycle accessory 60 and the quick switch device 50 to have an integrated appearance.

Figure 7:
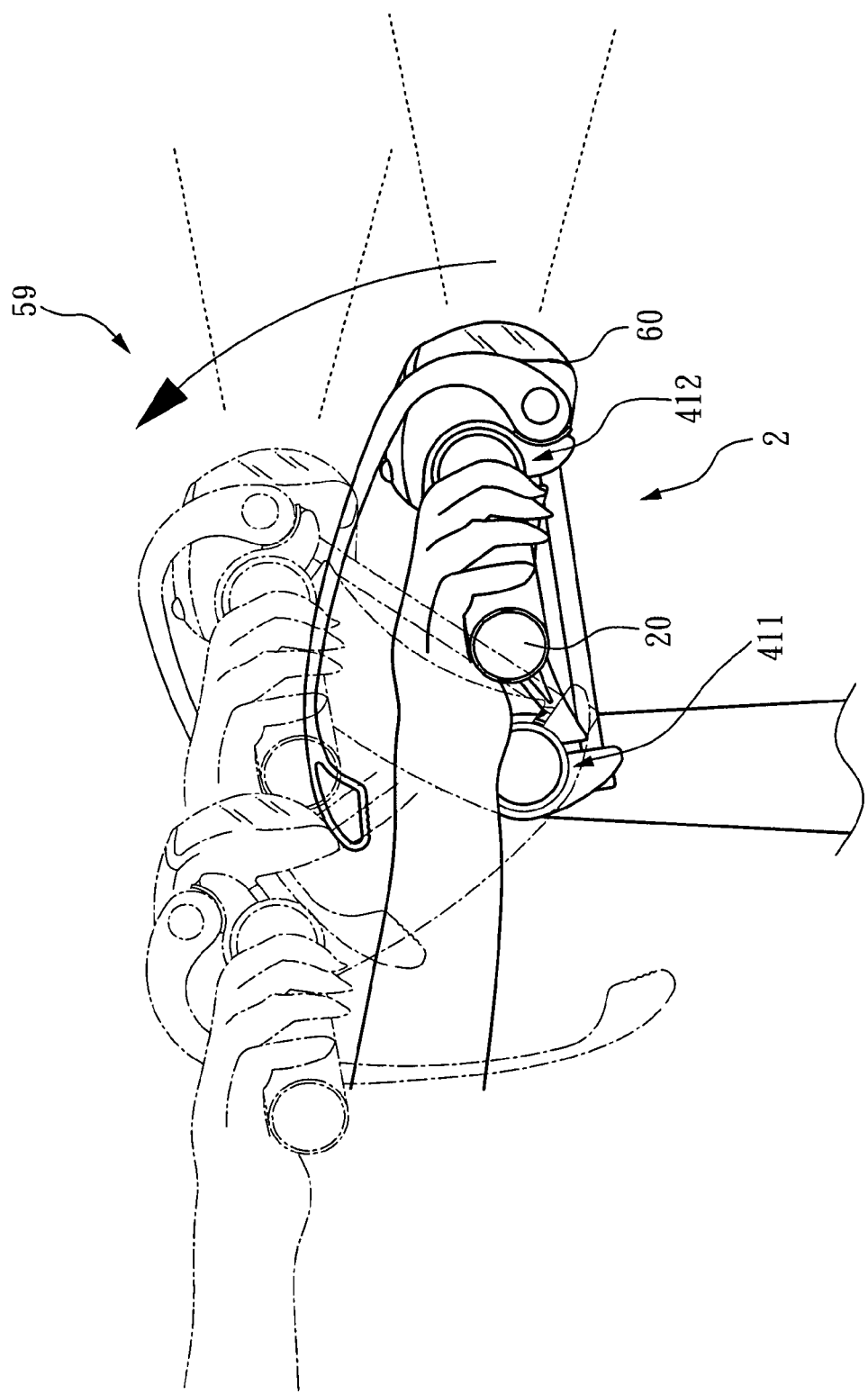
FIG. 7 is a schematic drawing showing that the position of the bicycle accessory does not have to be adjusted when the position of the handlebar of the present invention is adjusted.

Please refer to FIG. 7. A further feature of the present invention is that when the clamping state of each first clamping portion 411 and each second clamping portion 412 is the non-fastening state 59, which allows the user to adjust the position of the handlebar 20 such that the position of the handlebar 20 changes, the user does not have to loosen or readjust the bicycle accessory 60 from the handlebar 20, even though the bicycle accessory 60 (a headlight for example) is securely mounted to the handlebar 20. The reason is illustrated as follows. At this moment, the second clamping portion 412 and the handlebar 20 are in the non-fastening state 59. When the user holds the handlebar 20 and moves it upward, the handlebar 20 rotates relative to the second clamping portion 412 such that the bicycle accessory 60 still faces the front, as shown in FIG. 7. Thus, the design of the present invention provides improved facility of use. Similarly, adjusting the handlebar 20 does not change the angle of the bicycle accessory 60 or a brake lever (not shown in figures).

Figure 8:
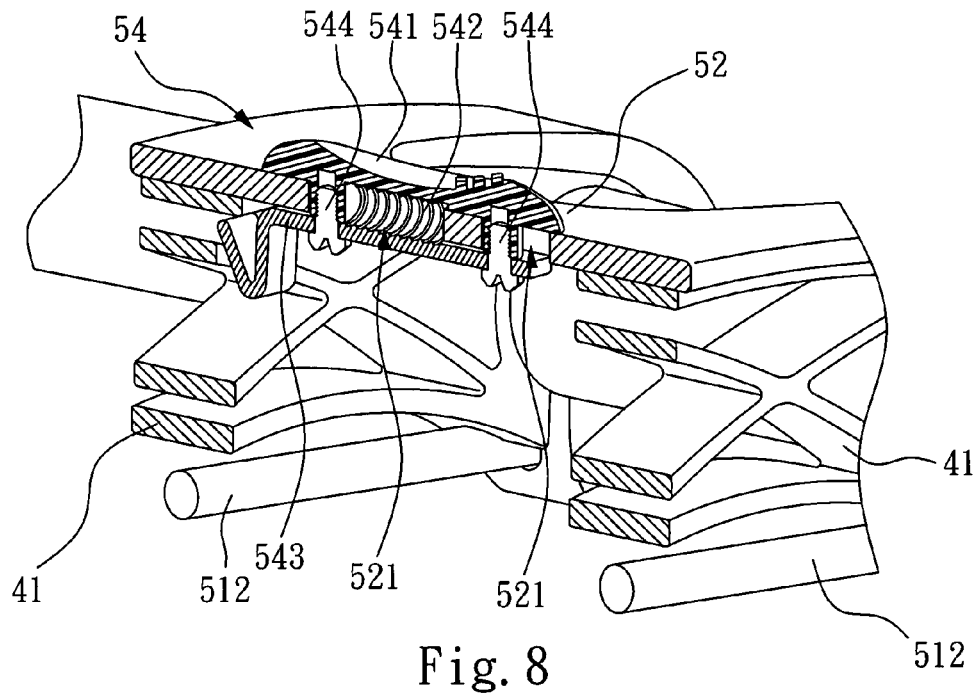
FIG. 8 is a cross-sectional schematic drawing of a safety control component of the bicycle of the present invention.
Figure 9:
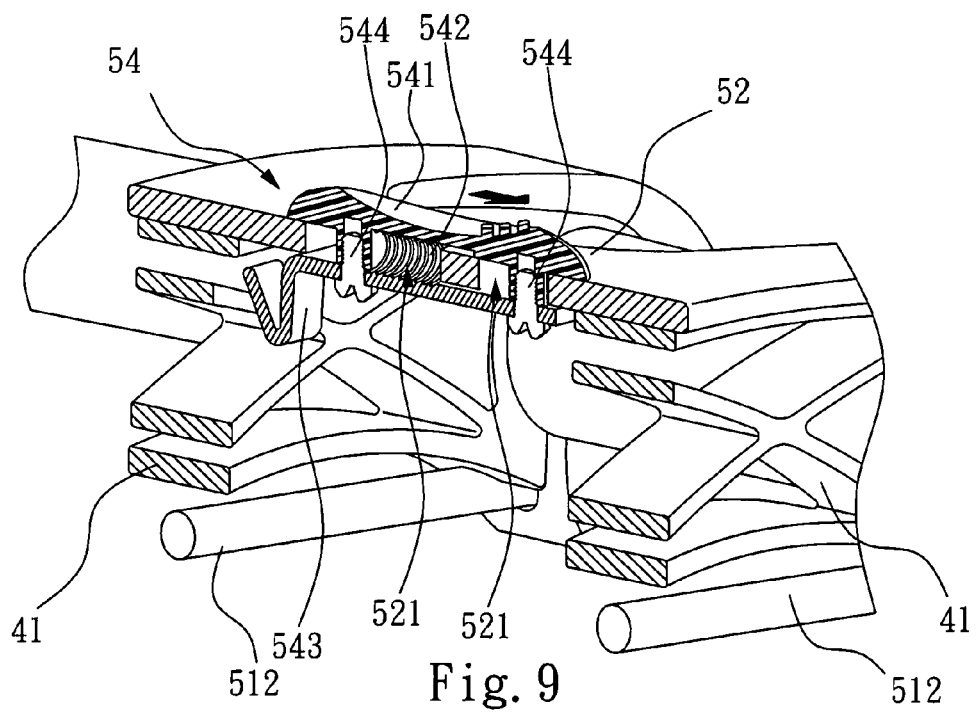
FIG. 9 is a cross-sectional schematic drawing of the safety control component of the bicycle of the present invention, which shows that the quick switch device is capable of being switched from the fastening state to the non-fastening state.

As shown in FIGS. 3, 8, and 9, in one embodiment of the present invention, the quick switch device 50 further comprises a safety control component 54. The safety control component 54 mounted on the horizontal connecting component 52 is used for controlling whether the horizontal connecting component 52 can move away from the horizontal rod 32. In other words, when the user wants to switch the quick switch device 50 from the fastening state (FIG. 8) to the non-fastening state (FIG. 9), he or she has to operate the safety control component 54 first.

In one embodiment of the present invention, the horizontal connecting component 52 comprises a plurality of through holes 521 (please also refer to FIG. 3). The safety control component 54 comprises a push bar 541, an elastic component 542 (e.g. a spring), a push plate 543, and a plurality of locking components 544. The elastic component 542 is located in one of the through holes 521. Each locking component 544 passes through the push plate 543 and each through hole 521 and is coupled to the push bar 541. As shown in FIG. 8, in the general situation, one end of the push plate 543 touches one side of one of the adjusting main bodies 41. As shown in FIG. 9, when the user wants to adjust the direction control device 2, he or she has to push the push bar 541 aside first to move the push plate 543 away from the adjusting main body 41, such that the horizontal connecting component 52 can be moved upward, away from the horizontal rod 32. When the user stops exerting force on the push bar 541, the push bar 541 and the push plate 543 return to the original position due to the elastic restoring force of the elastic component 542. This design prevents an undesired switch of the quick switch device 50 from the fastening state to the non-fastening state.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A bicycle comprising a front wheel, a rear wheel, a pedal gear device, a direction control device, and a main frame, which connects the front wheel, rear wheel, pedal gear device and direction control device, the direction control device being used for controlling the direction of the front wheel, characterized in that the direction control device comprises:
a handlebar;
a steering stem connected to the main frame, wherein the steering stem comprises a longitudinal rod and a horizontal rod, the longitudinal rod being joined to the horizontal rod, the horizontal rod being substantially parallel to the handlebar; and
two adjusting stems, each of the adjusting stems comprising an adjusting main body, a first clamping portion, and a second clamping portion, wherein the first clamping portion is located at a first end of the adjusting main body and the second clamping portion is located at a second end of the adjusting main body, and
both ends of the horizontal rod are clamped when each first clamping portion is in a fastening state, and unclamped when each first clamping portion is in a non-fastening state;
the handlebar is clamped when each second clamping portion is in a fastening state, and unclamped when each second clamping portion is in a non-fastening state; and
a quick switch device, the quick switch device being coupled to each adjusting stem, the quick switch device being used for controlling a clamping state of each first clamping portion and each second clamping portion;
wherein an attaching width on the handlebar between the two adjusting stems is more than 40 mm;
wherein the quick switch device controls the clamping state of each first clamping portion and each second clamping portion simultaneously;
wherein the quick switch device comprises two eccentric quick releases, each eccentric quick release controlling the clamping state of each first clamping portion and each second clamping portion of each adjusting stem;
wherein each eccentric quick release comprises a pivot eccentric part and a tensioning rod, and each pivot eccentric part is located at each second clamping portion; and
wherein the quick switch device comprises a horizontal connecting component for connecting the two eccentric quick releases such that the two eccentric quick releases can be operated simultaneously; when the horizontal connecting component is distal to the horizontal rod, the clamping state of each of the first clamping portions and each of the second clamping portions is the non-fastening state, and when the horizontal connecting component is proximal to the horizontal rod, the clamping state of each of the first clamping portions and each of the second clamping portions is the fastening state.

2. The bicycle as claimed in claim 1, wherein the quick switch device further comprises a safety control component mounted on the horizontal connecting component, the safety control component being used for controlling whether the horizontal connecting component can be distal to the horizontal rod.

3. The bicycle as claimed in claim 1, wherein there is a free space formed between the horizontal connecting component and the two eccentric quick releases such that a receiving space is formed around a middle portion of the handlebar.

4. The bicycle as claimed in claim 3, wherein the quick switch device further comprises a safety control component mounted on the horizontal connecting component, the safety control component being used for controlling whether the horizontal connecting component can be distal to the horizontal rod.

5. The bicycle as claimed in claim 4, wherein the bicycle further comprises a bicycle accessory located in the receiving space.

6. The bicycle as claimed in claim 5, wherein the bicycle accessory matches to the free space of the quick switch device such that the bicycle accessory and the quick switch device have an integrated appearance.

7. The bicycle as claimed in claim 6, wherein the bicycle accessory is a headlight.

8. The bicycle as claimed in claim 1, wherein the longitudinal rod is joined to the horizontal rod by means of soldering.

9. A bicycle comprising a front wheel, a rear wheel, a pedal gear device, a direction control device, and a main frame, which connects the front wheel, rear wheel, pedal gear device and direction control device, the direction control device being used for controlling the direction of the front wheel, characterized in that the direction control device comprises:
a handlebar;
a steering stem connected to the main frame, wherein the steering stem comprises a longitudinal rod and a horizontal rod, the longitudinal rod being joined to the horizontal rod, the horizontal rod being substantially parallel to the handlebar; and
two adjusting stems, each of the adjusting stems comprising an adjusting main body, a first clamping portion, and a second clamping portion, wherein the first clamping portion is located at a first end of the adjusting main body and the second clamping portion is located at a second end of the adjusting main body, and both ends of the horizontal rod are clamped when each first clamping portion is in a fastening state, and unclamped when each first clamping portion is in a non-fastening state;

the handlebar is clamped when each second clamping portion is in a fastening state, and unclamped when each second clamping portion is in a non-fastening state; and a quick switch device, the quick switch device being coupled to each adjusting stem, the quick switch device being used for controlling a clamping state of each first clamping portion and each second clamping portion;

wherein the quick switch device controls the clamping state of each first clamping portion and each second clamping portion simultaneously;

wherein the quick switch device comprises two eccentric quick releases, each eccentric quick release controlling the clamping state of each first clamping portion and each second clamping portion of each adjusting stem;

wherein each eccentric quick release comprises a pivot eccentric part and a tensioning rod, and each pivot eccentric part is located at each second clamping portion; and wherein the quick switch device comprises a horizontal connecting component for connecting the two eccentric quick releases such that the two eccentric quick releases can be operated simultaneously; when the horizontal connecting component is distal to the horizontal rod, the clamping state of each of the first clamping portions and each of the second clamping portions is the non-fastening state, and when the horizontal connecting component is proximal to the horizontal rod, the clamping state of each of the first clamping portions and each of the second clamping portions is the fastening state.

10. The bicycle as claimed in claim 9, wherein the quick switch device further comprises a safety control component mounted on the horizontal connecting component, the safety control component being used for controlling whether the horizontal connecting component can distal to the horizontal rod.

11. The bicycle as claimed in claim 9, wherein there is a free space formed between the horizontal connecting component and the two eccentric quick releases such that a receiving space is formed around a middle portion of the handlebar.

12. The bicycle as claimed in claim 11, wherein the quick switch device further comprises a safety control component mounted on the horizontal connecting component, the safety control component being used for controlling whether the horizontal connecting component can distal to the horizontal rod.

* * * * *